United States Patent [19]

Härtl

[11] Patent Number: 4,860,793
[45] Date of Patent: Aug. 29, 1989

[54] MIXING VALVE

[75] Inventor: Hans-Georg Härtl, Karlsruhe-Durlach, Fed. Rep. of Germany

[73] Assignee: Hewlett-Packard, Palo Alto, Calif.

[21] Appl. No.: 87,068

[22] Filed: Aug. 19, 1987

[30] Foreign Application Priority Data

Aug. 19, 1986 [EP] European Pat. Off. ........ 86111487.4

[51] Int. Cl.$^4$ .......................... F16K 1/14; F16K 1/26; F16K 11/20
[52] U.S. Cl. .................................. 137/606; 137/884; 251/335.2
[58] Field of Search ..................... 137/606, 884, 454.2, 137/901, 522, 523; 251/368, 129.02, 129.17, 272, 335.2

[56] References Cited

U.S. PATENT DOCUMENTS

| | | | |
|---|---|---|---|
| 978,288 | 12/1910 | Harkom | 251/335.2 |
| 1,693,676 | 12/1928 | Spinelle | 137/901 X |
| 2,098,583 | 11/1937 | Kleinsmith | 251/272 X |
| 2,665,105 | 1/1954 | Svabek | 251/272 |
| 3,538,940 | 11/1970 | Graham | 137/271 |
| 3,829,060 | 8/1974 | von Lëwis | 251/129.02 |
| 4,217,931 | 8/1980 | Jaekel | 137/606 |
| 4,228,821 | 10/1980 | Stark | 137/533.11 |
| 4,306,587 | 12/1981 | Tchebinyayeff | 137/884 X |
| 4,522,372 | 6/1985 | Yano et al. | 251/129.02 X |

FOREIGN PATENT DOCUMENTS

| | | | |
|---|---|---|---|
| 486700 | 4/1918 | France | 251/335.2 |
| 720211 | 4/1953 | United Kingdom | 251/335.2 |
| 848651 | 9/1960 | United Kingdom | 251/335.2 |
| 1012101 | 12/1965 | United Kingdom | 251/335.2 |
| 1183760 | 3/1970 | United Kingdom | 137/901 |

Primary Examiner—Stephen Hepperle
Attorney, Agent, or Firm—Richard F. Schuette

[57] ABSTRACT

A mixing valve for mixing a plurality of liquids comprises a number of valve units corresponding to the number of liquids to be mixed, each consisting of one inlet for liquid, one outlet and one ball valve having a valve ball and a valve seat.

11 Claims, 2 Drawing Sheets

MIXING VALVE

BACKGROUND OF THE INVENTION

The present invention relates to a mixing valve of the type employed where a plurality of liquids are to be mixed at very precise ratios, i.e. in liquid chromatography for generating a solvent gradient.

The process of mixing solvents is very common in liquid chromatography and is usually referred to as low-pressure gradient mixing. According to this process, small quantities of different solvents are drawn in succession by means of a pump forming part of the chromatograph and transferred in the mixed condition. The mixing valve is located between the supply tanks and the pump, and only one of the supply tanks is connected at any time with the pump. Since it is necessary to adhere very closely to the prescribed mixing rates in order to achieve high chromatographic measuring accuracy, very stringent demands are placed on the valve.

There have been mixing valves consisting of four valve units each having one inlet for the solvent to be drawn in and one closing element. A common discharge line is provided for the four valve units. In the case of these valves, liquid is drawn in at any time from one of the four supply tanks in response to activation of the respective closing element by respective lifting magnets. The closing element of known mixing valves comprises a conical element made of Teflon brand flouroplastic and a matching conical valve seat which is also made of Teflon in order to achieve the best possible sealing effect. For closing and opening a valve unit its conical teflon element is pushed into or retracted from the valve seat by means of an actuating element. However, the cooperating sealing elements of the known mixing valve tend to deform in the course of their service life so that the switching times required for completely closing or opening the valve increase gradually. Finally, the switching times increase in such a manner that the mixing valve no longer operates satisfactorily and has to be replaced by a new valve.

BRIEF SUMMARY OF THE INVENTION

According to the invention, each valve unit of the mixing valve is comprised of a ball and a seat made from a hard material, an actuating tappet for moving the ball to the closed position and an actuating pin that projects through the valve seat so as to exert pressure upon the ball under the influence of a spring. The ball is pushed clear of the valve seat when the actuating tappet is retracted from the closed position so that liquid can flow from the valve inlet to the valve outlet. This structure attains a substantially higher number of switching cycles at unvarying switching times than the known mixing valve. Another advantage of the invention lies in the fact that the switching times of the valve are very short, for example shorter than 2 milliseconds, so that the valve responds very quickly. The use of an actuating pin which urges the ball clear of the valve seat when the ball is released prevents the ball from sticking to the seat unwontedly in the event the two sealing partners should be charged electrostatically—a phenomenon which is sometimes encountered in the presence of certain solvents.

In an embodiment the valve chamber enclosing the ball valve is sealed off by a diaphragm on the side facing the actuating tappet. The service life of the mixing valve may be extended by providing a ball holder which prevents the diaphragm from being deformed by the ball and thereby avoides premature failure.

If specified materials are used for those parts of the mixing valve which come into contact with the liquid, any emission of heavy-metal ions into the liquid will be prevented. This is particularly advantageous in biotechnology.

According to another advantageous embodiment of the invention, the valve units of the mixing valve may be detachable from each other so that individual valve units can be exchanged if repairs should become necessary. In case of a defect in any one of the valve units, it is no longer necessary to exchange the whole mixing valve block so that the useful service life of the mixing valve is increased. In addition, it is also possible to replace individual valve units by dummy plates of a correspondingly adapted shape if not all of the existing valve units are connected to liquid supply tanks in the particular application. This enables the mixing valve to be adapted to different numbers of solvents without the need to exchange the whole mixing valve.

DETAILED DESCRIPTION OF THE INVENTION

Figure 1:
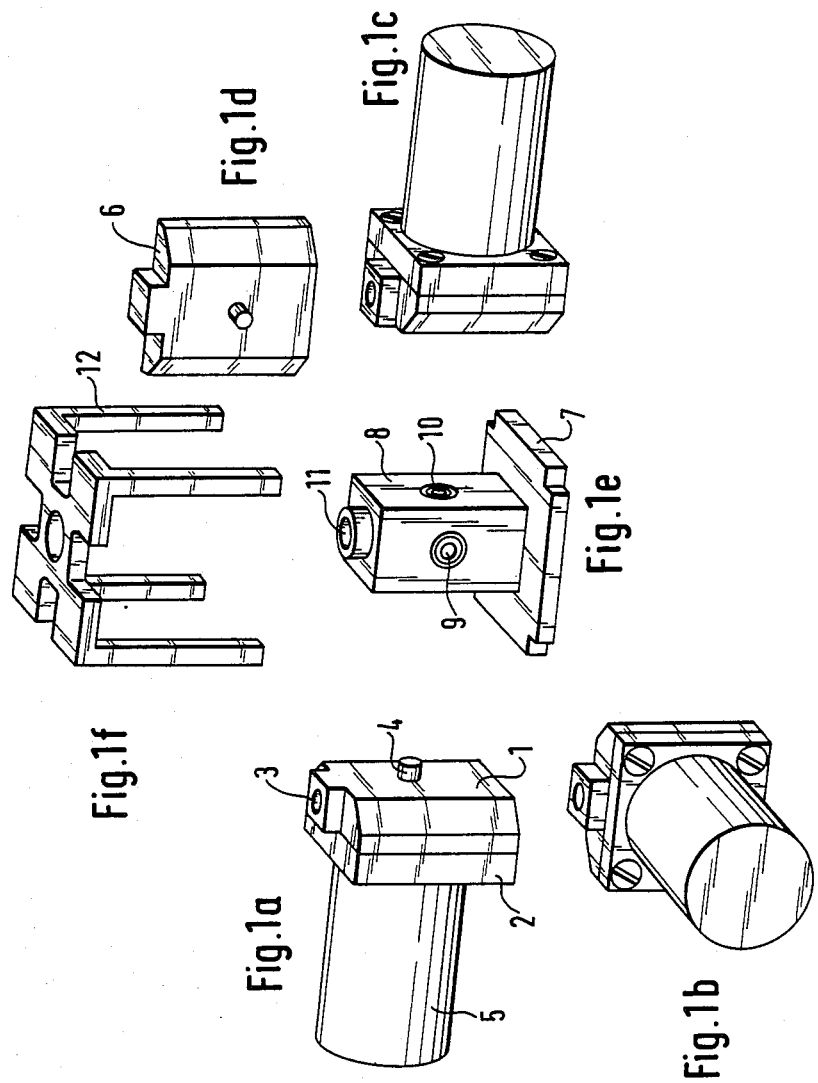
FIGS. 1a, 1b, and 1c are different persepctive views of individual valve units.
FIG. 1d is a perspective view of a dummy plug.
FIG. 1e is a perspective view of a central member having the common outlet channel.
FIG. 1f is a perspective view of a clamp for clamping the valve on a dummy unit to the central member of FIG. 1e.

FIGS. 1a to 1f show perspective views of the components of the invented mixing valve in the disassembled condition. The mixing valve according to FIGS. 1a to 1f comprises three valve units represented by FIGS. 1a, 1b, and 1c, respectively, and a dummy plug 6 shown in FIG. 1d. In the assembled condition, the three valve units and the dummy plug 6 are arranged around a central member shown in FIG. 1e and brought into contact with the latter by means of a clamp element 12 shown in FIG. 1f. The three valve units shown are substantially the same so that only the unit of FIG. 1a will be described. It has an inlet 3, one liquid outlet 4, a valve body 1, an adapter 2 screwed to the valve body and a lifting magnet 5. The closing element of the valve is located within the valve body 1 and will be described further below in connection with FIGS. 2 and 3. In the assembled condition of the valve, the outlets of the individual valve units are connected to the corresponding inlets of the central member of FIG. 1e that respectively lead to a common outlet channel inside the central member 8. The outlets of the valve units shown in FIGS. 1b and 1c are connected, for example, to the inlets 9 and 10, respectively, of the central member. The common outlet channel extending inside the central member 8 ends in an outlet 11 that can be connected to the pump for drawing in liquid from the supply tanks respectively connected to the valve inlets. The valve units are opened or closed by actuation of the associated lifting magnet. The liquids are drawn in from the different supply tanks as the lifting magnets are actuated from time to time, so that any desired solvent gradient can be produced.

If an additional supply tank is to be connected, the dummy plug 6 may be replaced by a valve unit similar to those shown in FIGS. 1a to 1c. If only two supply tanks are to be used, it is of course also possible to use two dummy plugs. Moreover, the invention is not limited to any combination of four valve units; rather, any desired number of valve units and/or corresponding dummy plugs can be combined, it being essential only that the mixing valve according to the invention is designed in modular form so that individual valve units can be replace either by a dummy plug or by a different valve unit. One of the advantages achieved by this design lies in the fact that in the event of a closing element becoming defective, this defect can be remedied by exchanging only one valve unit instead of replacing the whole mixing valve.

Figure 2:
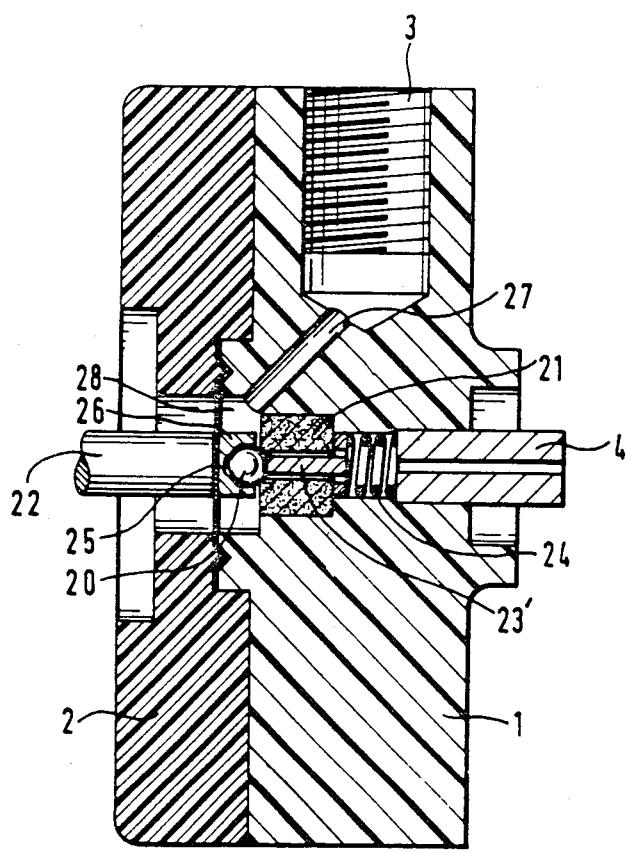
FIG. 2 is a cross-section of one type of construction for a valve unit.

FIG. 2 shows one valve unit of the mixing valve represented by FIGS. 1a to 1f which comprises several such valve units. The valve unit shown is comprised of a valve body 1 made from a plastic material which is resistant to solvent and suitable for injection molding, for example perflour alcoxy (PFA), so that it does not have to be machined and an adapter 2 made from a hard plastic and suitable for being screwed to the said valve body. The liquid enters the valve unit through the valve inlet 3. The inlet opening may be provided with an internal thread to enable a line leading to a liquid supply tank to be screwed in. The liquid then enters the valve chamber 28 through an inclined inlet channel 27. The valve chamber 28 is sealed on one side by a Teflon diaphragm 25 stretching between the adapter 2 and the valve body 3. The valve is designed as a ball valve having a ball 20 made of ruby and a valve seat 21 of sapphire. The valve ball 20 and the valve seat 21 are lapped-in in order to achieve efficient sealing. The ruby ball 20 is seated in a ball holder 26 to prevent the Teflon diaphragm from being deformed or damaged at the point where the ball 20 would be otherwise contact with it and cause premature failure of the valve. In the embodiment shown, the ball holder 26 takes the form of a metal cylinder provided with a blind hole which starts with the shape of a cylinder of a diameter somewhat larger than that of the valve ball and ends in a truncated cone. However, it is of course also possible to do without such a ball holder where any deformation of the diaphragm is not critical.

On the side of the Teflon diaphragm 25 opposite the valve chamber 28, there is an actuating tappet 22 magnetically coupled to a lifting magnet such as 5 of FIG. 1a. In the condition of the valve shown in FIG. 2, the actuating tappet bears upon the Teflon diaphragm causing the ball to be pushed into its seat so that the valve is closed.

An actuating pin 23 projecting through the valve 21 is pushed against the ball 20 by means of a spring 24. The spring shown is helical. One end bears upon the enlarged head 23' of the actuating pin 23 and its other end bears upon an outlet element 4 of a valve unit that is designed as a hollow cylinder. There is an annular space between the actuating pin 23 and the valve seat 21. To open the valve, the actuating tapped 22 is retracted by the lifting magnet 5 so that the actuating pin 23 pushes the ball 20 clear of its seat 21 under the action of the spring 24. The head 23' of the actuating pin 23 is provided with two holes through which liquid can flow from the annular space referred to toward the outlet element 4 when the ball 20 is not sealed, even though the head is in contact with the seal of the valve seat 21 opposite the ball 20.

The hollow-cylindrical outlet element 4, and the outlet elements of the other valve untis of the mixing valve as well, open into a common discharge line that can be connected to the pump for drawing in the liquid. I the embodiment shown, the common discharge line extends thorugh the central member 8 of FIG. 1e and ends in a common discharge 11 which may be provided with a thread for connecting a line. According to one embodiment of the invention, the central member 8 is made from PFA, as are the valve units, and there are provided molded-in sealing elements, not shown in the drawing, which ar disposed in annular arrangement about the individual outlet elements 4, and supported by a spring.

According to one possible embodiment of the invention, the ball has a diameter of 1.75 mm, the inner diameter of the valve seat is 1.2 mm, the diameter of the actuating pin 23 is 0.7 mm. The actuating pin 23, the spring 24, the ball holder 26 and the outlet element 4 are made from stainless steel, according to one embodiment of the invention.

In another embodiment of the invention the liquid outlet 4 extends inwardly to the side of the valve seat 21 opposite the ball 20 and a spring that exerts force on the ball 20 is mounted inside the valve seat 21 where the actuating pin 23 was. A ring mounted within the chamber 28 has a conical recess facing the diaphragm 25 to permit movement of the latter and a radial grove in the side facing the valve seat 21 to permit fluid to flow from the inlet channel 27 to the passageway containing the spring when a lifting magnet ceases to exert force on the actuating tappet 22.

An advantage of this design of is that it reduces the volume between the valve seat 21 and the outlet 4 and reduces the entrapment of gas bubbles that can interfere with the operation of the chromatograph.

It is understood that the invention is not limited to the embodiment described above and shown in the drawing. Instead of consisting of ruby and sapphire, the valve ball and the valve seat may for example consist of other hard materials. The actuating pin 23 and the spring 24 may also be made from titanium which provides the advantage, compared with stainless steel, that it does not emit any heavy-metal ions that could damage or destroy the sample to be examined. For the same reason, the ball holder may also consist of a ceramic material or of glass. Numerous variations from the example shown in FIG. 1 are imaginable also as regards the shape of the valve units, it being possible for example to remove any excessive material from the valve units and the central member with a view to saving material and weight.

I claim:

1. A valve unit comprising:
   a valve body,
   a valve chamber contained within said valve body,
   an inlet through which liquid may be introduced into said valve chamber,
   a diaphragm forming one side of said valve chamber,
   means forming a circular valve seat in the opposite side of said valve chamber, said means having a passageway communicating with said valve seat,
   a ball holder in said chamber having a flat surface in contact with said diaphragm and a socket on the side thereof opposite said flat surface, a ball retained between said socket and said valve seat, means for applying a resilient force to said ball via said passageway so as to urge it against the side of said diaphragm that is on the interior of said valve chamber, an outlet communicating with said passageway, and means bearing against the side of said diaphragm opposite said ball whereby application of force to said means overcomes the resilient force applied to said ball and forces said ball toward a sealing relationship with said circular valve.

2. A mixing valve assembly comprising:

a plurality of valve units as set forth in claim 1, a central member having a plurality of inlets coupled to an outlet thereof, said latter inlets being respectively coupled to said outlets for said valve unit, and means for clamping said plurality of valve units to said central member.

3. A mixing valve according to claim 1 in which the ball and valve seat are made from one of ruby and sapphire.

4. A valve unit according to claim 1 in which the inlet and outlet are formed in plastic material which is resistant to solvents and suitable for injection-molding.

5. A valve unit according to claim 1 in which the valve body is made of perfluor alcoxy.

6. A valve unit according to claim 1 in which a ball holder is provided between said ball and said diaphragm, said ball holder having a flat surface facing said diaphragm and a socket in the opposite surface.

7. A valve unit according to claim 1 wherein said means for applying a resilient force to said ball via said passageway includes a pin within said passageway and a spring mounted between said outlet and said pin for exerting a force on said ball via said pin.

8. A valve unit according to claim 7 in which a ball holder is provided between said ball and said diaphragm, said ball holder having a flat surface facing said diaphragm and a socket in the opposite surface.

9. A valve according to claim 7 in which the ball holder, the pin and the outlet are made from stainless steel.

10. A valve unit according to claim 7 in which the ball holder is made of a ceramic material, the pin and the spring are made from titanium and the outlet is made of glass.

11. A mixing valve according to claim 2 in which the central member is made of a plastic material which is resistant to solvents and suitable for injection molding.

* * * * *